United States Patent

Hogan

[19]

[11] Patent Number: 6,137,952
[45] Date of Patent: Oct. 24, 2000

[54] APPARATUS AND METHOD FOR DEGRADING THE QUALITY OF UNAUTHORIZED COPIES OF COLOR IMAGES AND VIDEO SEQUENCES

[75] Inventor: Josh N. Hogan, Los Altos, Calif.

[73] Assignee: Hewlett-Packard Company, Palo Alto, Calif.

[21] Appl. No.: 09/053,974

[22] Filed: Apr. 2, 1998

[51] Int. Cl.[7] .................................................. H04N 7/167
[52] U.S. Cl. ........................... 386/94; 348/577; 348/576; 348/575; 360/60; 380/201; 380/203; 705/57
[58] Field of Search ..................... 348/577, 576, 348/575; 386/94; 360/60, 15; 380/200, 201, 203, 217, 202; 705/57, 58; 713/176; H04N 7/167, 5/76

[56] References Cited

U.S. PATENT DOCUMENTS

| | | | |
|---|---|---|---|
| 4,644,422 | 2/1987 | Bedini | 360/60 |
| 4,733,295 | 3/1988 | Hemsky et al. | 358/22 |
| 4,953,008 | 8/1990 | Kaye | 358/22 |
| 5,126,834 | 6/1992 | Enomoto et al. | 358/28 |
| 5,243,411 | 9/1993 | Shirochi et al. | 380/200 |
| 5,394,274 | 2/1995 | Kahn | 360/60 |
| 5,418,853 | 5/1995 | Kanota et al. | 360/60 |
| 5,481,608 | 1/1996 | Wijnen | 360/60 |
| 5,523,853 | 6/1996 | Yamashita et al. | 358/335 |
| 5,537,216 | 7/1996 | Yamashita et al. | 360/60 |
| 5,574,787 | 11/1996 | Ryan | 380/201 |
| 5,627,655 | 5/1997 | Okamoto et al. | 386/94 |
| 5,659,613 | 8/1997 | Copeland et al. | 360/60 |
| 5,689,559 | 11/1997 | Park | 360/60 |
| 5,699,434 | 12/1997 | Hogan | 380/201 |
| 5,828,754 | 10/1998 | Hogan | 380/201 |
| 5,859,950 | 1/1999 | Iwamoto | 386/94 |
| 5,883,959 | 3/1999 | Kori | 380/201 |
| 5,889,868 | 3/1999 | Moskowitz et al. | 380/51 |
| 5,905,798 | 5/1999 | Nerlikar et al. | 360/60 |
| 5,915,018 | 6/1999 | Aucsmith | 380/200 |
| 5,923,754 | 7/1999 | Angelo et al. | 705/57 |
| 5,930,369 | 7/1999 | Cox et al. | 380/200 |
| 5,953,417 | 9/1999 | Quan | 386/94 |
| 5,959,717 | 9/1999 | Chaum | 352/40 |
| 5,960,151 | 9/1999 | Takahashi | 386/94 |
| 5,960,398 | 9/1999 | Fuchigami et al. | 360/60 |
| 5,991,499 | 11/1999 | Yagasaki et al. | 386/94 |
| 6,002,830 | 12/1999 | Quan | 386/94 |
| 6,005,936 | 12/1999 | Shimizu et al. | 380/200 |
| 6,018,608 | 1/2000 | Sakashita et al. | 380/202 |

*Primary Examiner*—John K. Peng
*Assistant Examiner*—Jean W. Désir

[57] ABSTRACT

Image-distorting artifacts are added to selected areas of a color image. A first artifact change is made to a luminance component of a selected area, and at least one other artifact change is made to chrominance components of the selected area. The artifact changes are perceptively balanced such that the artifacts are not perceptible when the image is displayed on a monitor. For example, changes in saturation are selected to balance changes in intensity of luminance. However, when the image is filtered such that one of the artifacts is modified, the remaining artifact becomes visible. Such filtering might be performed by an RGB-to-NTSC converter. Thus, if the RGB-to-NTSC converter is used between an RGB output of DVD-ROM electronics and a computer monitor (in an attempt to make an unauthorized copy), the video signal leaving the RGB-to-NTSC converter will contain perceptible artifacts and, therefore, images of reduced viewability. Consequently, attempts to make unauthorized copies of DVD discs onto NTSC-type videocassettes will be discouraged.

26 Claims, 4 Drawing Sheets

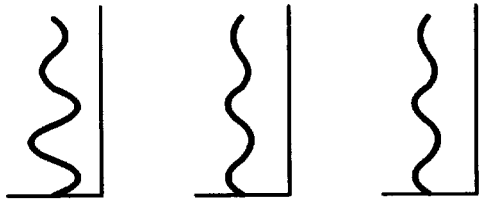
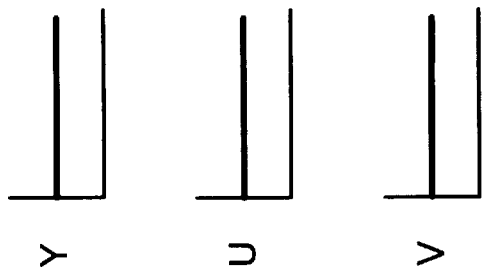
FIG. 3a    FIG. 3b    FIG. 3c
Y
U
V
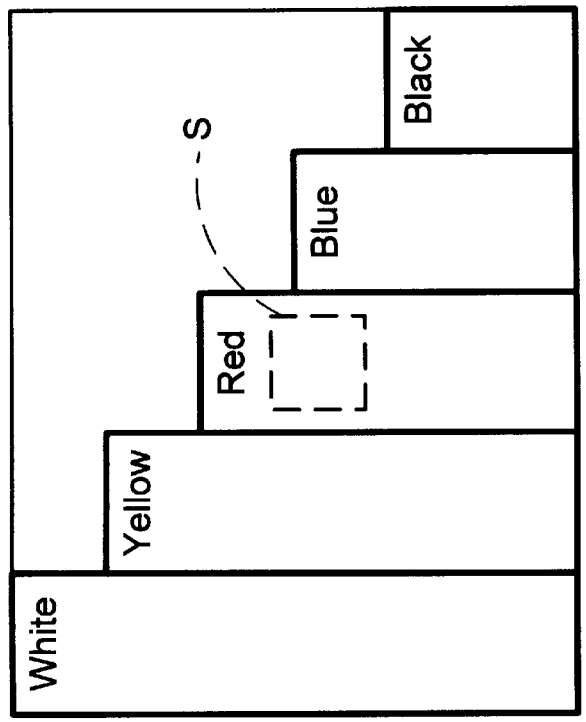
FIG. 2

FIGURE 5
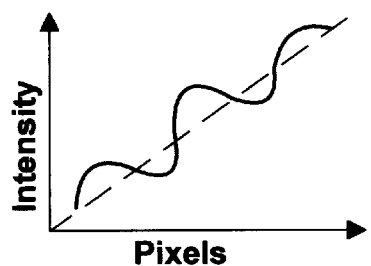
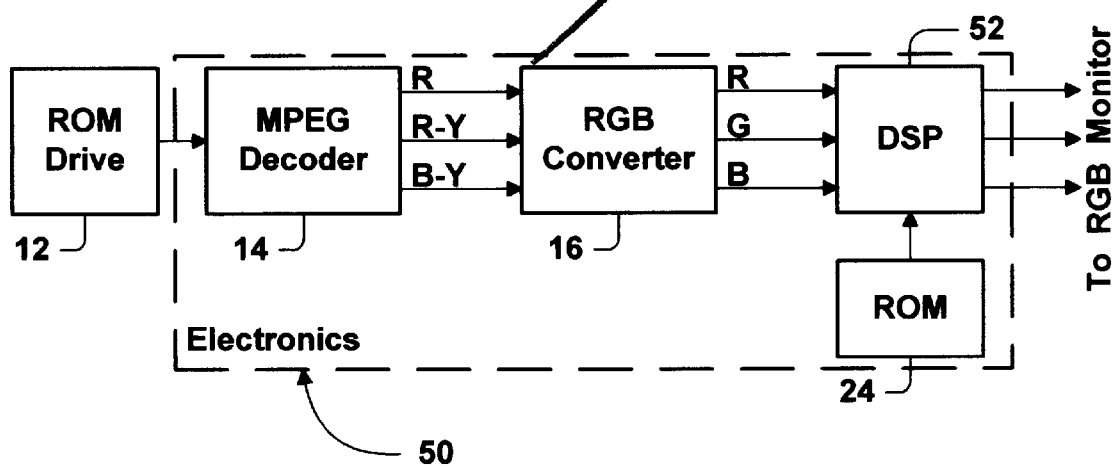
FIGURE 7
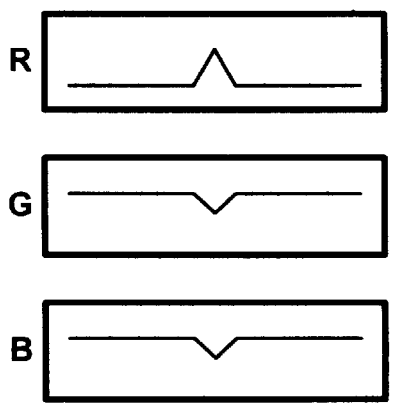
FIGURE 8
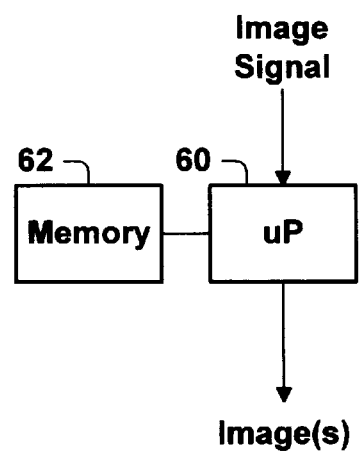

APPARATUS AND METHOD FOR DEGRADING THE QUALITY OF UNAUTHORIZED COPIES OF COLOR IMAGES AND VIDEO SEQUENCES

BACKGROUND OF THE INVENTION

The invention relates to image and video display. More specifically, the invention relates to methods and apparatus for discouraging the unauthorized copying of digital color images and video sequences.

Digital Versatile Disc (DVD) players are providing consumers with access to wide screen movies having high quality images and high fidelity sound. The high quality format of the DVD players brings theatre-like entertainment to the home.

However, the high quality format of DVD players also allows high quality copies to be made on videocassette recorders. Anyone with a videocassette recorder has the ability to make professional quality VHS copies of their DVD releases. In the absence of a copy protection scheme, quality of the unauthorized VHS copies is generally comparable to the quality of VHS originals sold in stores. Therefore, unauthorized copying and distribution of DVD releases poses a challenge for copyrights owners who want to protect their intellectual property rights and store owners who want to protect their videocassette businesses.

The DVD players presently utilize a copy protection scheme that is transparent to the images being displayed by the DVD player. Trigger bits are set on a DVD disc. While the DVD disc is being played, the trigger bits activate a certain digital-analog converter chip inside the DVD player. The chip then applies copy protection to an NTSC output of the DVD player.

This copy protection scheme is based on differences in the way VCRs and televisions operate. The automatic gain control (AGC) circuits within a television are designed to respond slowly to change, whereas the AGC circuits within a VCR are designed to respond quickly to change. The scheme attempts to take advantage of these differences by modifying the video signal so that quality of the original video signal will be unaffected when displayed on a television, yet quality of an unauthorized copy of the video signal will be degraded. When the NTSC output of the DVD player is recorded on a VCR, the resulting VHS copies will typically have reduced viewability or quality.

However, attempts are being made to defeat the copy protection scheme utilized by the DVD players. Commercial "stabilizers" are presently available on the market.

Moreover, the copy protection scheme can be defeated on DVD-ROM drives for computers. A DVD-ROM drive allows the same high quality format videos to be played on a computer monitor. However, the DVD-ROM drive does not output an NTSC signal. Instead it outputs an analog RGB signal, which is unprotected between the computer and the monitor. An RGB-NTSC converter between the computer and the monitor can convert the unprotected RGB signal to the NTSC domain for storage on a videocassette or other recorder. Thus, a simple RGB-to-NTSC converter would allow a person to bypass the copy protection scheme on the DVD-ROM drive and record the video on a videocassette recorder.

Home copying and professional piracy remain great threats to artists, producers, copyrights owners and owners of videocassette businesses. There is still a need for discouraging the unauthorized copying and distribution of images and video sequences, especially with regards to DVD-ROM drives for computers.

SUMMARY OF THE INVENTION

The invention can be regarded as a method of processing a signal representing an image. The signal is analyzed to select an area having minimal detail in the image. A plurality of artifacts are added to domain components of a selected area by making a first artifact change in a first domain component of the selected area and making at least one other artifact change in at least one other domain component of the selected area such that the artifacts are perceptively balanced. Thus, the artifacts are not perceptible while the processed signal is being displayed. However, if the processed signal is modified such that the balance between the artifacts is destroyed, at least one of the image-distorting artifacts will become perceptible while the modified signal is being displayed.

This method can be utilized by a DVD-ROM drive and associated electronics. If an RGB-to-NTSC converter is connected between a computer monitor and an RGB output of the apparatus, and an RGB signal on the RGB output is converted to an NTSC signal and recorded on a recorder, the balance between the artifacts in the recorded signal will be destroyed. Therefore, when played back, the recorded signal will display perceptible artifacts that reduce viewability. Thus, the method discourages unauthorized copying of DVD discs.

Other aspects and advantages of the present invention will become apparent from the following detailed description, taken in conjunction with the accompanying drawings, illustrating by way of example the principles of the invention.

BRIEF DESCRIPTION OF THE DRAWINGS

FIG. 2 is an illustration of an image that is generated by the DVD-ROM electronics;

FIG. 3a is an illustration of YUV components for a selected area of the image, prior to RGB conversion by the DVD-ROM electronics;

FIG. 3b is an illustration of the YUV components after artifacts have been added;

FIG. 3c is an illustration of the YUV components following unauthorized RGB-to-NTSC conversion of an RGB output of the DVD-ROM electronics;

FIG. 5 is an illustration of an image-distorting artifact added to a gradually-increasing luminance component of a minimally-detailed area;

FIG. 6 is an alternative embodiment of the DVD-ROM drive and associated electronics;

FIG. 7 is an illustration of RGB components after an artifact has been injected by the alternative embodiment of the DVD-ROM electronics; and FIG. 8 is an alternative embodiment of a processor according to the present invention.

DETAILED DESCRIPTION OF THE INVENTION

Figure 1:
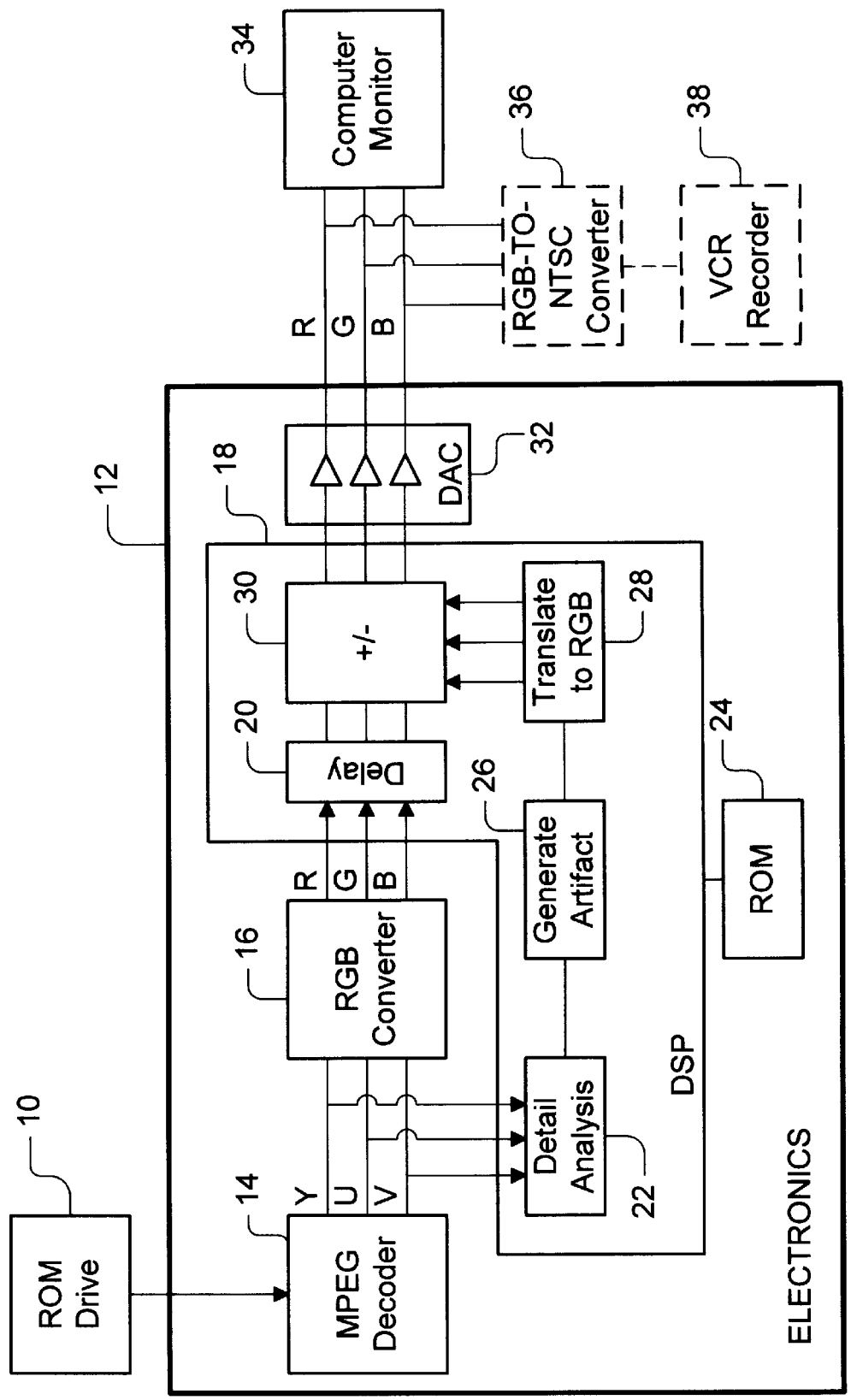
FIG. 1 is a block diagram of a DVD-ROM drive and associated electronics according to the present invention.

As shown in the drawings for purposes of illustration, the present invention is described in connection with a DVD- ROM drive and associated electronics for a computer. The DVD-ROM electronics generates an RGB signal including artifacts that discourage unauthorized copying. Even if the RGB signal from the DVD-ROM electronics is converted to an NTSC signal and recorded on a videocassette recorder, the resulting VHS copies will still contain images of degraded quality and, therefore, reduced viewability. Thus, a person could not make high quality VHS copies by using an RGB-to-NTSC converter between the monitor and an RGB output of the DVD-ROM electronics.

FIG. 1 shows a DVD-ROM drive 10 and associated electronics 12 for a computer. The drive 10 plays DVD discs. Data stored on the DVD discs is compressed according to a well-known MPEG standard. When a DVD disc is being played, an output of the ROM drive 10 provides a stream of MPEG-compressed data to the DVD-ROM electronics 12. An MPEG decoder 14 decodes the data stream into a video signal separated into luminance and chrominance components. Hereinafter, the video signal will be described in connection with Y (luminance), U (chrominance) and V (chrominance) components of a YUV domain. The YUV domain is used merely to facilitate an understanding the invention. It is understood that the components of the video signal could be from a different domain, such as a Y, R-Y, B-Y domain.

An RGB converter 16 converts the video signal leaving the MPEG decoder 14 to an RGB domain having Red, Green and Blue components. A video signal leaving the RGB converter 16 is unprotected from unauthorized copying.

To discourage unauthorized copying from occurring, image-distorting artifacts are added to the video signal leaving the RGB converter 16. The YUV components of the video signal are supplied to a digital signal processor (DSP) 18. The DSP 18 delays (e.g., stores) the video signal leaving the RGB converter 16 (block 20) and performs detail analysis on the image represented by the YUV components of the video signal (block 22). The DSP 18 looks for image areas having minimal detail. Minimal detail areas include areas that have relatively flat colors and areas of gradually-changing brightness and color. In contrast, high detail areas include edges and other areas of sharp changes in intensity and color. FIG. 2 provides an example of a multicolor bar chart having minimal and high detail areas. Although the bar chart is shown in black and white, each bar represents a different color. Between the side edges of each bar is minimal detail —constant color. High detail occurs at the side edges, where colors change abruptly. The selected area S has minimal detail.

When an area of minimal detail is selected, the DSP 18 retrieves a pattern from Read-Only Memory (ROM) 24 and generates image-distorting artifacts (block 26). Luminance of an image-distorting artifact has a changing pattern of intensity. For example, the changing pattern could be a random pattern or a well defined pattern such as a sinusoidal wave. If only the luminance component of the sinusoidal wave was displayed on a computer monitor, dark and light white bands would be perceived by a viewer.

However, the chrominance component of another image-distorting artifact has a changing pattern of saturation. The changes in saturation are selected to balance the perceived changes in intensity of the luminance. Consequently, the image-distorting artifacts are not perceptible when the balanced luminance and chrominance components are viewed together on a computer monitor.

After the image-distorting artifacts have been generated, the DSP 18 translates the artifacts from the YUV domain to the RGB domain (block 28). The translated artifacts are then added to the delayed RGB signal (block 30). Thus, selected areas of the RGB signal leaving the DSP 18 include the image-distorting artifacts. The artifacts are introduced in the RGB domain because all three components of the RGB domain have the same high bandwidth.

A digital-to-analog converter 32 converts the digital RGB signals leaving the DSP 18 to analog RGB signals. The analog RGB signals, in turn, are sent to an RGB output of the DVD-ROM electronics 12 and supplied to a monitor 34 for display. Because the artifacts are perceptively balanced in the RGB domain, the artifacts displayed on the monitor 34 are not perceptible to a viewer.

However, if the RGB signals leaving the DVD-ROM drive are intercepted by an RGB-to-NTSC converter 36, the images recorded on a VCR 38 will be degraded (the RGB-to-NTSC converter 36 and the VCR 38 do not form a part of the invention; they are described merely to facilitate and understanding of the invention). In the RGB domain, the Red, Green and Blue components have the same bandwidth. In the YUV domain, however, U and V components each have a smaller bandwidth than luminance component. Therefore, the RGB-to-NTSC converter 36 filters the U and V components much more heavily than the luminance component. Heavy filtering causes the changes in saturation of the U and V components to be modified substantially (e.g., filtered out substantially or blocked entirely). In contrast, the changes in intensity of the luminance component are modified less substantially (e.g., passed entirely or filtered out only slightly). Thus, a signal containing unbalanced artifacts is recorded by the VCR 38. Consequently, the unbalanced artifact in the luminance component becomes perceptible when the unauthorized copy is played back on a television. The copied images are degraded such that viewability is reduced. Consequently, the copied images are unsuitable for redistribution. Thus, unauthorized copying of the DVD disc is discouraged.

FIGS. 3a, 3b and 3c illustrate how the image-distorting artifacts appear in an unauthorized copy of an image. For a selected area of the image, FIG. 3a shows constant intensity and saturation of the luminance and chrominance components. FIG. 3b shows the luminance and chrominance signals after the artifacts have been added. The luminance and chrominance components are no longer constant, instead having patterns of changing intensity and saturation. However, the changes in intensity of the luminance component are balanced by the changes in saturation of the chrominance components. For example, an increase in intensity is balanced by a decrease in saturation. Therefore, when the components of FIG. 3b are converted to the RGB domain and displayed on the monitor, the viewer does not perceive the changes in intensity and saturation. Although the components of FIG. 3c are shown in the YUV domain, the artifacts are likely to be introduced in the RGB domain.

However, RGB-to-NTSC conversion causes the changes in saturation of the chrominance components to be modified substantially, while the changes in the intensity of the luminance component are modified less substantially. The unbalanced artifact in the luminance component is perceived when the unauthorized copy of the image is displayed.

Figure 4:
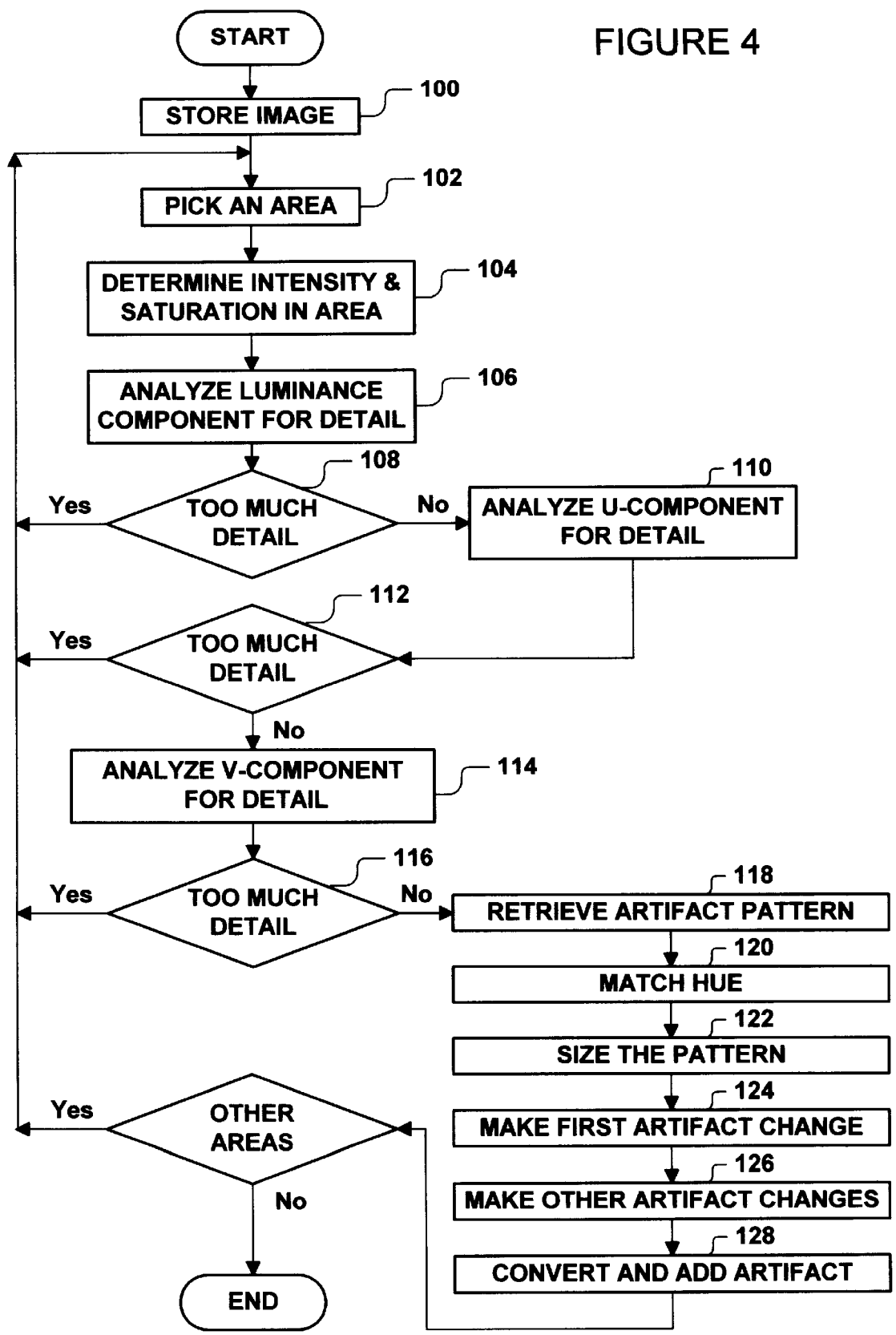
FIG. 4 is a flowchart of a method of imposing image-distorting artifacts on a selected area of an image, the method being performed by a digital signal processor, which forms a part of the DVD-ROM electronics.

FIG. 4 shows a method of performing detail analysis and generating image-distorting artifacts. The DSP 18 stores an image in memory (step 100) and picks a candidate area for analysis (step 102). For example, the image could be broken up into 8×8 blocks, and the blocks could be analyzed sequentially.

Next, intensity and saturation of the luminance and chrominance components for the candidate area are determined (step 104). Since the artifacts will increase and decrease the intensity and saturation of the luminance and chrominance components, the DSP 18 determines whether the intensity and saturation of the candidate area can be modified. For instance, a candidate area having an intensity of 15 bits would not be able to accommodate a sine wave artifact having an amplitude of 40 bits. It follows that areas having black or white backgrounds, for example, would not be selected.

If an artifact can be imposed on the candidate area, the DSP 18 analyzes luminance of the candidate area for detail (step 106). Edges are to be avoided. If the luminance component has edges and other high detail characteristics, it will be difficult to create a smooth pattern that allows the changes in intensity to be balanced. Resulting will be edges that can perceived by a viewer. Therefore, if too much detail is found in the luminance component (step 108), the candidate area is not selected and the DSP 18 analyzes the next area (step 102).

If, however, the luminance component of the candidate area is relatively free of detail and does not contain any abrupt edges, the DSP 18 then analyzes the U chrominance component for detail (step 110). If too much detail is found in the U chrominance component (step 112), the candidate area is not selected and the DSP 18 analyzes the next area (step 102). If, however, the U chrominance component of the candidate area is relatively free of detail, the DSP 18 analyzes the V chrominance component for detail (step 114). If too much detail is found in the V chrominance component (step 116), the candidate area is not selected and DSP 18 analyzes the next area (step 102). If, however, the V chrominance component of the candidate area is relatively free of detail, the DSP 18 selects the candidate area.

If a candidate area is selected, the DSP 18 retrieves an artifact pattern from the ROM 24 (step 118). The artifact pattern has a predetermined shape and intensity that will create a smooth, controlled transition in the luminance and chrominance components. The changes in intensity and saturation are relatively smooth. If the changes in intensity and saturation are sharp, it will be difficult to perceptively balance them out. However, if too smooth, the changes in saturation will not be filtered out by the RGB-to-NTSC converter 36 and will be recorded by the VCR 38.

At step 120, a hue for the artifact is selected to match the hue of the selected area. At step 122, the DSP 18 sizes the retrieved pattern to fit in the selected area. Thus, the amplitude of the artifact pattern is adjusted to fit within the intensity/saturation range. Intensity of the artifact is typically a function of the intensity of luminance.

At steps 124 and 126, the DSP 18 adds image-distorting artifacts to at least two of the domain components of the image signal by making a first artifact change in the luminance component of the selected area (step 124) and making a second artifact change in one or both of the U and V chrominance components (step 126) such that the first artifact change is balanced and, therefore, perceptively canceled by the second artifact change while the image is being displayed. For example, a first sine wave is imposed on the luminance component, giving the luminance component a smooth, changing pattern. The first sine wave has an amplitude that is proportional to intensity of the luminance. An inverse sine wave is then imposed in the chrominance. The inverse sine wave has an amplitude which is proportional to saturation of the hue. The sum of the amplitudes in the chrominance perceptively balances the amplitude of the luminance.

At step 128, the DSP 18 converts and adds the artifacts to the stored RGB signal. During RGB-to-NTSC conversion, unbalanced filtering of the image signal destroys the balance between the artifacts and causes the image-distorting artifacts to be perceived in the selected area when a filtered image is displayed. Consequently, a pirated copy of the RGB signal would display at least one of the artifacts.

If intensity of the luminance of the selected area increases gradually, the luminance component could appear as shown in FIG. 5. The luminance component of the original area is shown in dashed, and the luminance signal containing the artifact is shown in solid.

The lack of perceptibility of the artifacts in the processed RGB signal might vary from monitor to monitor. This issue could be addressed by customizing the artifacts for a particular monitor. For example, a typical customization procedure might involve calibration during installation of the DVD-ROM drive 10 and electronics 12 to optimize performance for the particular monitor being used. The calibration would involve viewing artifacts on a portion of the monitor and changing intensity or saturation until the artifacts are blended or the contrast is softened. Perceptibility of the artifacts is saturation-dependant. Actual intensity works better at higher intensity colors. Therefore, artifacts can be made more perceptible by exploiting the saturation effect.

The MPEG decoder 14 could be implemented in an ASIC. The ROM 24, in addition to storing the artifacts, could also store instructions for instructing the DSP 18 to perform detail analysis (block 22), generate the artifacts (block 26), translate the artifacts to the RGB domain (block 28), and add the translated artifacts to the delayed signal (block 30). An alternative to the ROM 24 could be a random pattern generator for generating the artifacts.

FIG. 6 shows an alternative embodiment of a DVD-ROM drive 10 and associated electronics 50. The electronics 50 includes the MPEG decoder 14 and the RGB converter 16. However, a DSP 52 performs detail analysis on the RGB components provided by the RGB converter 16 instead of the YUV components provided by the MPEG decoder 14. Moreover, the DSP 52 generates the image-distorting artifacts from components of the RGB domain instead of the components of the YUV domain. FIG. 7 shows artifacts that have been added to the Red, Green and Blue components. Thus, the RGB output of the RGB converter 16 is simultaneously stored and used for generating artifacts. This embodiment would allow the DSP 52 to interface with a single ASIC including the MPEG decoder 14 and the RGB converter 16.

FIG. 8 shows a microprocessor 60 that receives an image signal. The microprocessor 60 is programmed to store the image signal, perform detail analysis on the image signal, select the artifacts, translate the artifacts to the domain of the stored signal, and add the artifacts to the stored signal. Artifact patterns are stored in a memory 62. Instructions for the microprocessor 60 are also stored in memory 62. The microprocessor 60 can also perform pre-processing such as decoding and domain conversion on the image signal.

Thus disclosed is an invention that discourages unauthorized copying of video images. The invention is particularly applicable to DVD-ROM electronics and DVD players. Even if the RGB signal from the DVD-ROM electronics is converted to an NTSC signal and recorded on a videocassette recorder, the unauthorized copy will still contain images having unbalanced artifacts in the luminance and chrominance components. Such degraded images would be unsuitable for viewing. Consequently, unauthorized copying of the DVD disc would be discouraged.

However, the invention is not limited only to DVD-ROM electronics and DVD players. Nor is the invention limited to display devices including MPEG decoders. Compression is not even required.

The invention can be applied to situations where bandwidths of domain components are changed during conversion of the video signal. YUV-to-RGB conversion is but one example.

The image-distorting artifacts could produce countermarking images. For example, if an unauthorized copy of an image is made, an image-distorting artifact including a message could appear when the pirated image is displayed. For example, the message could state "WARNING: ILLEGAL COPY." The message could appear as a visible watermark.

Other modifications can be made to the specific embodiments above. For example, the artifacts could be of any shape and any number. On the image of FIG. 2, for example, there could be only one artifact for the entire image, or one or more artifacts for each bar.

There are different ways to balance the domain components. In the YUV domain, for example, a change in intensity of luminance could be balanced by a change in the saturation of the U component alone, or it could be balanced by changes in the saturation of both the U component and the V component.

Looking for areas of minimal detail is not limited to analyzing areas for flatness of color. For example, the DSP 18 could find areas having minimal detail by looking at edges in an image.

The description above provides an example of one type of artifact. There are others. For example, high frequency artifacts in the Blue component would be less visible than high frequency artifacts in the Green component. Modification (e.g., RGB-to-NTSC conversion) could cause the high frequency artifact in the Blue component, which would normally be imperceptible, to cross over to the Green component and become perceptible when the modified signal is displayed.

Thus, the invention is not limited to the specific embodiments described above. Instead, the invention is construed according to the claims that follow.

What is claimed is:

1. A method of processing a signal representing an image, the image signal having domain components, the method comprising:
   analyzing the signal to select an area having minimal detail in the image;
   adding a plurality of image-distorting artifacts to the domain components of the selected area by making a first artifact change in a first domain component of the selected area; and making at least one other artifact change in at least one other domain component of the selected area such that the artifacts are perceptively balanced, whereby balanced artifacts are not perceptible while the processed signal is being displayed, and whereby if the processed signal is modified such that the balance between the artifacts is destroyed, at least one of the image-distorting artifacts is perceptible while the modified signal is being displayed.

2. The method of claim 1, wherein the first artifact change causes bands to be perceived in the selected area when the balance is destroyed and the modified signal is displayed.

3. The method of claim 1, wherein the image-distorting artifacts cause a watermark to appear in the selected area when the balance is destroyed and the modified signal is displayed.

4. The method of claim 1, wherein the domain components are part of a domain in which luminance and chrominance components are separated.

5. The method of claim 4, wherein the artifact changes include making intensity changes in the luminance component of the selected area; and wherein the at least one other artifact change includes making saturation changes in the chrominance component of the selected area to perceptively balance the intensity changes.

6. The method of claim 5, wherein the step of analyzing the signal includes the steps of looking for minimal detail in the luminance component of the image; and looking for minimal detail in the chrominance components of the image if minimal detail in the luminance component is not found.

7. The method of claim 4, wherein the artifact changes include selecting an artifact pattern; matching hue of the artifact pattern with hue of the selected area; adjusting intensity of a luminance component of the artifact pattern to fit within the selected area; and changing saturation of the hue of the artifact pattern to fit within the selected area.

8. The method of claim 4, wherein selecting the area and making the artifact changes includes the steps of:
   picking a candidate area;
   selecting a candidate area having relatively constant hue and saturation in the image;
   making intensity changes in the luminance component of the selected area; and
   making saturation changes in the chrominance component of the selected area to perceptively balance the change in intensity of the luminance component of the selected area.

9. The method of claim 1, wherein the domain components are in the RGB domain, and wherein the artifact changes are made to at least two components of the RBG domain.

10. The method of claim 9, wherein the artifact changes include changing intensities of the RGB components such that the artifacts are perceptively balanced when displayed.

11. Apparatus for processing an image signal:
    means for analyzing the image signal to select a minimally detailed area of an image represented by the image signal; and
    means for adding image-distorting artifacts to at least two domain components of the selected area by making a first artifact change in at least one domain component of the selected area; and making a second artifact change in at least one other domain component of the selected area such that the artifacts are perceptively balanced while the image is being displayed, whereby at least one of the artifacts is perceptible in the selected area when the balance between the artifacts has been destroyed and the image is displayed.

12. The apparatus of claim 11, wherein the domain components are part of a domain in which luminance and chrominance components are separated.

13. The apparatus of claim 12, wherein the analyzing means analyzes the signal by looking for minimal detail in the luminance component of the image; and looking for minimal detail in the chrominance components of the image if minimal detail in the luminance component is not found.

14. The apparatus of claim 12, wherein the adding means adds the artifact changes by making intensity changes in the luminance component of the selected area; and making saturation changes in the chrominance component of the selected area to perceptively balance the intensity changes.

15. The apparatus of claim 12, wherein, when the area is selected, the adding means selects an artifact pattern;

matches hue of the artifact pattern with hue of the selected area; makes intensity changes in the luminance component of the artifact pattern to fit within the selected area; and makes saturation changes in the hue of the artifact pattern to fit within the selected area.

16. The apparatus of claim 12, wherein the analyzing means selects the area and the adding means makes the artifact changes by defining an area of relatively constant hue and saturation, making intensity changes in the luminance component of the selected area; and making saturation changes in the chrominance component in the portion to perceptively balance intensity changes.

17. Apparatus comprising:

a decoder;

a converter responsive to an output of the decoder; and a digital signal processor for analyzing an output of the decoder to select a minimally detailed area of an image furnished on the output of the decoder; adding image-distorting artifacts to at least two domain components of the selected area by making a first artifact change in at least one domain component of the selected area; and making at least one other artifact change in at least one other domain component of the selected area such that the artifacts are perceptively balanced while the image is being displayed.

18. The apparatus of claim 17, wherein the digital signal processor analyzes the decoder output by looking for minimal detail in the luminance component of the image; and looking for minimal detail in the chrominance components of the image if minimal detail in the luminance component is not found.

19. The apparatus of claim 17, wherein the digital signal processor adds the artifacts by making intensity changes in the luminance component of the selected area; and making saturation changes in the chrominance component of the selected area to perceptively balance intensity changes.

20. The apparatus of claim 17, wherein, after the area is selected, the digital signal processor selects an artifact pattern having a luminance component and a chrominance component; matches hue of the artifact pattern with hue of the selected area; adjusts intensity of the luminance component of the artifact pattern to fit within the selected area; and changes saturation of the hue of the artifact pattern to fit within the selected area.

21. The apparatus of claim 17, wherein the digital signal processor selects the area and makes the artifact changes by selecting an area of relatively constant hue and saturation in the image; making intensity changes in the luminance component of the selected area; and making saturation changes in the chrominance component in the selected area to balance the changes in intensity.

22. An article of manufacture for a processor, the article comprising:

memory; and a plurality of executable instruction encoded in the memory, the instructions, when executed, causing the processor to analyze luminance and chrominance components of an image signal and select areas of minimal detail; generate image-distorting artifacts for the luminance component and at least one of the chrominance components; and add the artifacts to the image signal, the artifacts being added to the selected areas such that the artifacts are perceptively canceled when displayed.

23. The article of claim 22, wherein the instructions cause the processor to analyze the signal by looking for minimal detail in the luminance component of the image; and by looking for minimal detail in the chrominance components of the image if minimal detail in the luminance component is not found.

24. The article of claim 22, wherein the instructions cause the processor to add the artifacts by making intensity changes in the luminance component of the selected area; and making saturation changes in the chrominance component of the selected area to perceptively balance the changes in intensity.

25. The article of claim 22, wherein, after the area is selected, the instructions cause the processor to select an artifact pattern; match hue of the artifact pattern with hue of the selected area; adjust intensity of a luminance component of the artifact pattern to fit within the selected area; and change saturation of the hue of the artifact pattern to fit within the selected area.

26. The article of claim 22, wherein the instructions cause the processor to make the artifact changes by defining an area of relatively constant hue and saturation in the image; making intensity changes in the luminance component of the selected area; and making saturation changes in the chrominance component of the selected area to perceptively balance the intensity changes in the luminance component of the selected area.

* * * * *